(12) United States Patent
Jiang et al.

(10) Patent No.: US 12,333,104 B2
(45) Date of Patent: Jun. 17, 2025

(54) TOUCH MODULE, TOUCH DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yichen Jiang, Beijing (CN); Hongqiang Luo, Beijing (CN); Guiyu Zhang, Beijing (CN); Zhenhua Li, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/771,563

(22) Filed: Jul. 12, 2024

(65) Prior Publication Data
US 2024/0361858 A1 Oct. 31, 2024

Related U.S. Application Data

(63) Continuation of application No. 17/286,509, filed as application No. PCT/CN2021/071285 on Jan. 12, 2021, now Pat. No. 12,086,338.

(30) Foreign Application Priority Data

Jan. 21, 2020 (CN) .......................... 202010072055.9

(51) Int. Cl.
*G06F 3/041* (2006.01)
*G06F 3/044* (2006.01)
(52) U.S. Cl.
CPC .......... *G06F 3/0412* (2013.01); *G06F 3/0443* (2019.05); *G06F 3/0446* (2019.05); *G06F 3/0448* (2019.05)

(58) Field of Classification Search
CPC ......... G06F 3/0412; G06F 2203/04111; G06F 2203/04112; G06F 2203/04113
See application file for complete search history.

(56) References Cited

U.S. PATENT DOCUMENTS 12,086,338 B2 * 9/2024 Jiang ..................... G06F 3/0448
2009/0315859 A1 12/2009 Chien et al.
(Continued)

FOREIGN PATENT DOCUMENTS

| CN | 101833408 A | 9/2010 |
|---|---|---|
| CN | 102915155 A | 2/2013 |

(Continued)

OTHER PUBLICATIONS

International Search Report and Written Opinion received for PCT Patent Application No. PCT/CN2021/071285, mailed on Apr. 9, 2021, 10 pages (5 pages of English Translation and 5 pages of Original Document).

(Continued)

*Primary Examiner* — Kevin M Nguyen
(74) *Attorney, Agent, or Firm* — ArentFox Schiff LLP; Michael Fainberg

(57) ABSTRACT

The disclosure provides a touch module, a touch display panel and a display device. Each touch electrode includes a plurality of electrode blocks arranged along an extending direction, and electrode blocks belonging to other touch electrodes are distributed in an area where at least part of all the electrode blocks are located, which makes full use of an interior area of a traditional touch pattern and increases a coupling area between the touch electrodes. When touch occurs, an amount of change in a mutual capacitance value between the touch electrodes will be significantly increased, thereby increasing touch sensitivity.

20 Claims, 10 Drawing Sheets

(56) References Cited

U.S. PATENT DOCUMENTS

| | | |
|---|---|---|
| 2012/0223893 A1 | 9/2012 | Yang et al. |
| 2013/0321004 A1 | 12/2013 | Chen et al. |
| 2014/0009437 A1 | 1/2014 | Hung et al. |
| 2014/0253499 A1 | 9/2014 | Lee et al. |
| 2018/0348948 A1 | 12/2018 | Lee et al. |
| 2019/0361546 A1 | 11/2019 | Pang et al. |

FOREIGN PATENT DOCUMENTS

| | | |
|---|---|---|
| CN | 103455223 A | 12/2013 |
| CN | 103927031 A | 7/2014 |
| CN | 108388368 A | 8/2018 |
| CN | 207780739 U | 8/2018 |
| CN | 108984048 A | 12/2018 |
| CN | 109407866 A | 3/2019 |
| CN | 109933240 A | 6/2019 |
| CN | 110058745 A | 7/2019 |
| JP | 2018-116564 A | 7/2018 |
| JP | 2018-206352 A | 12/2018 |
| KR | 10-2018-0131832 A | 12/2018 |
| WO | 2012/096210 A1 | 7/2012 |
| WO | 2018/032353 A1 | 2/2018 |

OTHER PUBLICATIONS

Office Action received for Chinese Patent Application No. 202010072055.9, mailed on Dec. 2, 2022, 27 pages (14 pages of English Translation and 13 pages of Original Document).

Office Action received for Japanese Patent Application No. 2021-569099, mailed on Jan. 7, 2025, 6 pages (3 pages of English Translation and 3 pages of Original Document).

\* cited by examiner

TOUCH MODULE, TOUCH DISPLAY PANEL AND DISPLAY DEVICE

CROSSING REFERENCES TO RELATED APPLICATIONS

The disclosure is continuation of U.S. patent application Ser. No. 17/286,509, filed on Apr. 19, 2021, which is a national phase entry under 35 U.S.C. § 371 of International Application No. PCT/CN2021/071285, filed on Jan. 12, 2021, which claims the priority of the Chinese patent application No. 202010072055.9, entitled "TOUCH MODULE, TOUCH DISPLAY PANEL AND DISPLAY DEVICE", filed with the Chinese Patent Office on Jan. 21, 2020, which is herein incorporated by reference in its entirety.

FIELD

The disclosure relates to the technical field of display, and in particular to a touch module, a touch display panel and a display device.

BACKGROUND

Electronic devices are being widely used in our daily life. Touch screens, with the direct manipulation ability, have become mainstream products of information interaction among the electronic devices today. With continuous development of society, requirements for various aspects of the touch display screens by users have been continuously growing.

Touch is detected and located by sensing a change in sensor channel capacitance corresponding to a finger touch area by charge and discharge scanning the touch sensor channel capacitance. Improving touch sensing sensitivity contributes to the improvement of touch performance.

SUMMARY

Embodiments of the disclosure provide a touch module including: a base substrate; and a plurality of touch electrodes located on the base substrate. Each of the plurality of touch electrodes includes a plurality of electrode blocks along an extending direction, and electrode blocks belonging to other touch electrodes are distributed in an area where at least part of all electrode blocks are located.

In some embodiments, the plurality of touch electrodes include a plurality of first touch electrodes extending along a first direction and a plurality of second touch electrodes extending along a second direction;

each of the plurality of first touch electrodes comprises a plurality of first electrode blocks and a plurality of second electrode blocks, and each of the plurality of second touch electrodes comprises a plurality of third electrode blocks and a plurality of fourth electrode blocks;

in a same one of the plurality of first touch electrodes: the plurality of first electrode blocks are arranged in sequence along the first direction; each of the plurality of second electrode blocks is located in an area where a third electrode block adjacent to the plurality of first electrode blocks are located; the plurality of second electrode blocks and the plurality of third electrode blocks are insulated from each other; and each of the plurality of second electrode blocks and adjacent ones of the plurality of first electrode blocks are connected in series; and in a same one of the second touch electrodes: the plurality of third electrode blocks are arranged in sequence along the second direction; each of the plurality of fourth electrode blocks is located in an area where a first electrode block adjacent to the plurality of third electrode blocks are located; the plurality of fourth electrode blocks and the plurality of first electrode blocks are insulated from each other; and each of the plurality of fourth electrode blocks and adjacent ones of the plurality of third electrode blocks are connected in series.

In some embodiments, in the same one of the first touch electrodes, the plurality of first electrode blocks arranged in sequence along the first direction are connected in series; and in the same one of the second touch electrodes, the plurality of third electrode blocks arranged in sequence along the second direction are connected in series.

In some embodiments, the plurality of first touch electrodes and the plurality of second touch electrodes are in a same film layer;

the plurality of third electrode blocks each has a first hollow region in an area corresponding to a second electrode block, and an orthographic projection of the first hollow region on the base substrate covers an orthographic projection of the second electrode block on the base substrate; and the plurality of first electrode blocks each has a second hollow region in an area corresponding to a fourth electrode block, and an orthographic projection of the second hollow region on the base substrate covers an orthographic projection of the fourth electrode block on the base substrate.

In some embodiments, the touch module further comprises a first bridge through which each of the plurality of second electrode blocks and adjacent ones of the plurality of first electrode blocks are connected in series; and the touch module further comprises a second bridge through which each of the plurality of fourth electrode blocks and adjacent ones of the plurality of third electrode blocks are connected in series.

In some embodiments, an orthographic projection of the first bridge on the base substrate and an orthographic projection of the second bridge on the base substrate do not overlap with each other.

In some embodiments, the orthographic projection of the first bridge on the base substrate and the orthographic projection of the second bridge on the base substrate do not overlap with each other.

All electrode blocks are in an electrode layer, the first bridge and the second bridge are in a bridge layer, and the bridge layer and the electrode layer have an insulation layer therebetween.

In some embodiments, the orthographic projection of the first bridge on the base substrate and the orthographic projection of the second bridge on the base substrate do not overlap with each other.

The bridge layer is between the electrode layer and the base substrate.

In some embodiments, the first hollow region is provided therein a first floating electrode at a periphery of the second electrode block, and an orthographic projection of the first floating electrode on the base substrate is a closed hollow pattern enclosing the second electrode block.

In some embodiments, the second hollow region is provided therein a second floating electrode at a periphery of the fourth electrode block, and an orthographic projection of the second floating electrode on the base substrate is a closed hollow pattern enclosing the fourth electrode block.

In some embodiments, the plurality of first touch electrodes and the plurality of second touch electrodes are in different film layers.

In some embodiments, each of the plurality of third electrode blocks has two second electrode blocks belonging to different first touch electrodes, and the two second electrode blocks in a same third electrode block are insulated from each other.

In some embodiments, each of the plurality of first electrode blocks has two fourth electrode blocks belonging to different second touch electrodes, and the two fourth electrode blocks in a same first electrode block are insulated from each other.

In some embodiments, opposite outer boundaries of each of the plurality of second electrode blocks and the plurality of third electrode blocks are in a concave-convex zigzag shape; and/or, opposite outer boundaries of each of the plurality of fourth electrode blocks and the plurality of first electrode blocks are in a concave-convex zigzag shape.

In some embodiments, a shape of each of the plurality of third electrode blocks is a rhombus, a shape of each of the plurality of second electrode blocks is a triangle, and two sides of each of the plurality of second electrode blocks and two sides of a corresponding third electrode block are set in parallel.

In some embodiments, a shape of each of the plurality of first electrode blocks is a rhombus, a shape of each of the plurality of fourth electrode blocks is a triangle, and two sides of each of the plurality of fourth electrode blocks and two sides of a first corresponding electrode block are set in parallel.

The embodiments of the disclosure further provide a touch display panel including the touch module according to the embodiments of the disclosure.

In some embodiments, the touch display panel further includes a light emitting device on the base substrate and a packaging structure for packaging the light emitting device. The plurality of touch electrodes are on a side of the packaging structure facing away from the light emitting device.

In some embodiments, the packaging structure includes a first inorganic layer, an organic layer and a second inorganic layer that are stacked in sequence.

the touch display panel further comprises a buffer layer between the second inorganic layer and the plurality of touch electrodes.

The embodiments of the disclosure further provide a display device including the touch display panel according to the embodiments of the disclosure.

DETAILED DESCRIPTION OF THE EMBODIMENTS

In order to make the objectives, technical solutions, and advantages of the embodiments of the disclosure clearer, the technical solutions of the embodiments of the disclosure will be described clearly and comprehensively with reference to the accompanying drawings of the embodiments of the disclosure. Obviously, the described embodiments are part of the embodiments of the disclosure rather than all of them. Based on the described embodiments of the disclosure, all the other embodiments obtained by those skilled in the art without creative labor fall within the protection scope of the disclosure.

Unless otherwise defined, the technical terms or scientific terms used herein should have common meanings understood by those skilled in the field to which the disclosure belongs. The expressions "first", "second" and similar expressions used in the disclosure do not indicate any sequence, quantity or importance, but are only used to distinguish different components. The expressions "include" or "contain" and the like intend to indicate that elements or items preceding the expressions cover elements or items and their equivalents following the expressions, but do not exclude other elements or items. The expressions "connected" or "connecting" and the like are not limited to physical or mechanical connections, but may include electrical connections, whether direct electrical connections or indirect electrical connections. The expressions "upper", "lower", "left", "right" and the like are only used to indicate relative positional relationships, and when an absolute position of the described object changes, the relative positional relationship may also change accordingly.

In order to keep the following descriptions of the embodiments of the disclosure clear and concise, the disclosure omits detailed descriptions of known functions and known components.

A touch module according to embodiments of the disclosure includes:
a base substrate; and
a plurality of touch electrodes on the base substrate, wherein
each of the plurality of touch electrodes includes a plurality of electrode blocks arranged along an extending direction; and
electrode blocks belonging to other touch electrodes are distributed in an area where at least part of all the electrode blocks are located.

Figure 1:
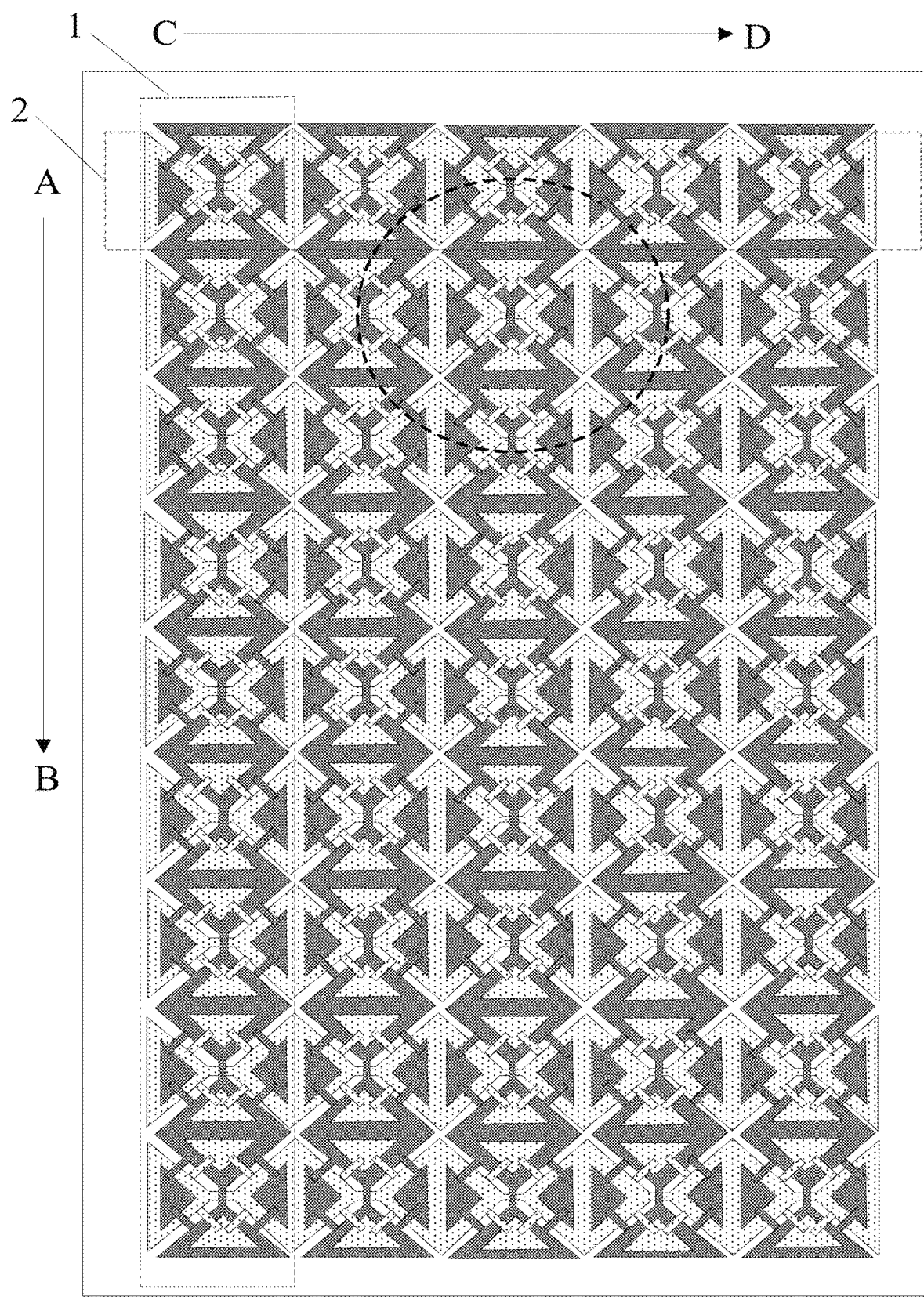
FIG. 1 is a schematic structural diagram of a touch module according to embodiments of the disclosure.

Specifically, referring to FIG. 1, in the touch module according to the embodiments of the disclosure, a plurality of touch electrodes may include a plurality of first touch electrodes 1 extending along a first direction AB and a plurality of second touch electrodes 2 extending along a second direction CD.

Figure 2:
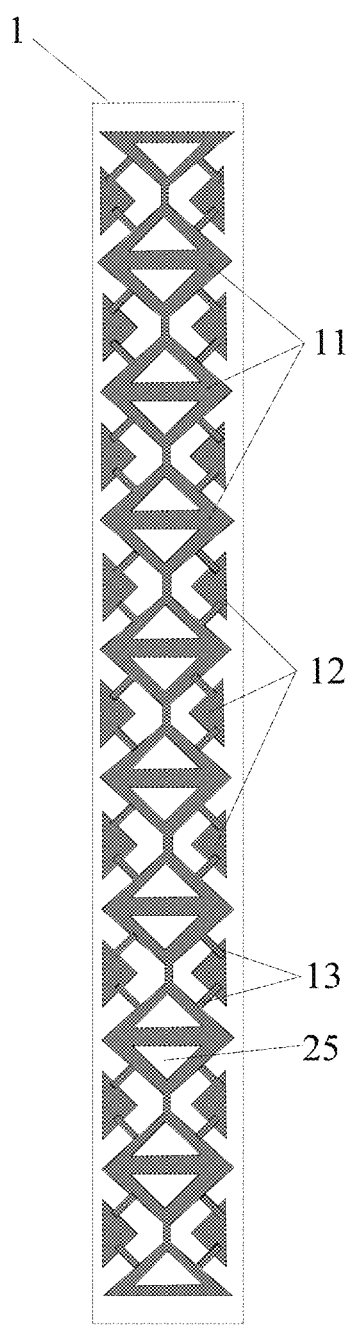
FIG. 2 is a schematic structural diagram of a first touch electrode in a touch module according to embodiments of the disclosure.
Figure 3:
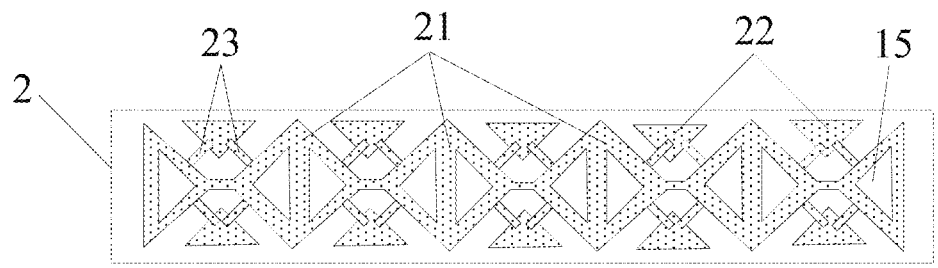
FIG. 3 is a schematic structural diagram of a second touch electrode in a touch module according to embodiments of the disclosure.

Referring to FIGS. 2 and 3, FIG. 2 is a schematic diagram of one of the first touch electrodes 1, and FIG. 3 is a schematic diagram of one of the second touch electrodes 2, each of the first touch electrodes 1 including a plurality of first electrode blocks 11 and a plurality of second electrode blocks 12, and each of the second touch electrodes 2 including a plurality of third electrode blocks 21 and a plurality of fourth electrode blocks 22.

Figure 4:
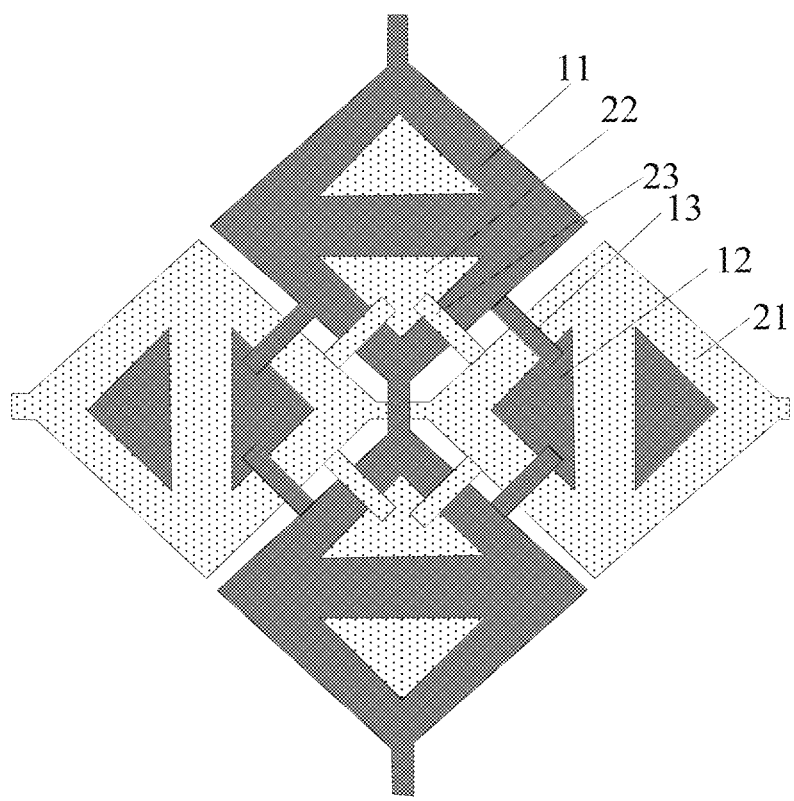
FIG. 4 is an enlarged view of the structure in the area indicated by a dashed cycle in FIG. 1.

Referring to FIGS. 2 and 4, FIG. 4 is an enlarged view of a dashed circle area in FIG. 1. In the same one of the first touch electrodes 1, the plurality of first electrode blocks 11 are arranged in sequence along the first direction AB, the second electrode blocks 12 are located in an area where the third electrode blocks 21 adjacent to the first electrode blocks 11 are located. The second electrode blocks 12 and the third electrode blocks 21 are insulated from each other, and the second electrode blocks 12 and adjacent ones of the first electrode blocks 11 are connected in series.

Referring to FIGS. 3 and 4, in the same one of the second touch electrodes 2, the plurality of third electrode blocks 21 are arranged in sequence along the second direction CD, the fourth electrode blocks 22 are located in an area where the first electrode blocks 11 adjacent to the third electrode blocks 21 are located. The fourth electrode blocks 22 and the first electrode blocks 11 are insulated from each other, and the fourth electrode blocks 22 and adjacent ones of the third electrode blocks 21 are connected in series.

In some embodiments, referring to FIGS. 2 and 4, in the touch module according to the embodiment of the disclosure, in the same one of the first touch electrodes 1, the plurality of first electrode blocks 11 arranged in sequence along the first direction AB may be connected in series. Referring to FIGS. 3 and 4, in the same one of the second touch electrodes 2, the plurality of third electrode blocks 21 arranged in sequence along the second direction CD may be connected in series.

In the touch module according to the embodiment of the disclosure, in the area of the third electrode blocks 21 of the second touch electrodes 2, the second electrode blocks 12 of the first touch electrodes 1 are provided; and in the area of the first electrode blocks 11 of the first touch electrodes 1, the fourth electrode blocks 22 of the second touch electrodes 2 are provided. Such design makes full use of interior areas of the third electrode blocks 21 and the first electrode blocks 11 and increases a coupling area of the first touch electrodes 1 and the second touch electrodes 2. When a touch occurs, an amount of change in a mutual capacitance value of the corresponding first touch electrodes 1 and second touch electrodes 2 will be significantly increased, thereby increasing touch sensitivity and solving the problem of low touch sensitivity in related technologies.

In some embodiments, referring to FIG. 2, for one of the first touch electrodes 1, the second electrode blocks 12 may be both provided in two of the third electrode blocks 21 adjacent to each of the first electrode blocks 11. That is, if the first direction AB is a longitudinal direction, the plurality of first electrode blocks 11 of one of the first touch electrodes 1 are arranged in a column, and the plurality of second electrode blocks 12 of the one of the first touch electrodes 1 are distributed in two columns and are respectively located on both sides of the one column of the first electrode blocks 11. Similarly, for one of the second touch electrodes 2, the fourth electrode blocks 22 may be both provided in two of the first electrode blocks 11 adjacent to each of the third electrode blocks 21. That is, if the second direction CD is a horizontal direction, the plurality of third electrode blocks 21 of the one of the second touch electrodes 2 are arranged in a row, and the plurality of fourth electrode blocks 22 of the one of the second touch electrodes 2 are arranged in two rows and are respectively located on both sides of one row of the third electrode blocks 21.

In order to more clearly understand principles of improving touch sensitivity by the touch module according to the embodiments of the disclosure, an example of the first touch electrodes 1 being driving electrodes Tx and the second touch electrodes 2 being sensing electrodes Rx will be used below for specific illustrations with reference to FIGS. 5-7.

Figure 5A:
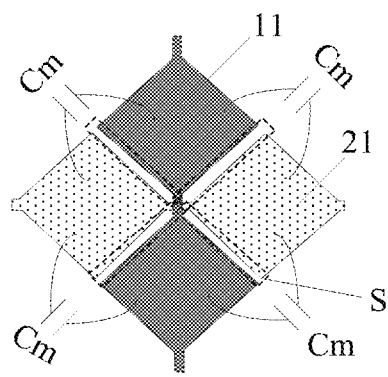
FIG. 5A is a schematic diagram of a traditional touch module.
Figure 5B:
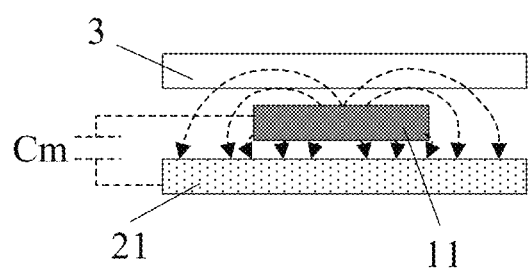
FIG. 5B is a schematic diagram illustrating the original electronic field state of the touch module showing in FIG. 5A.
Figure 5C:
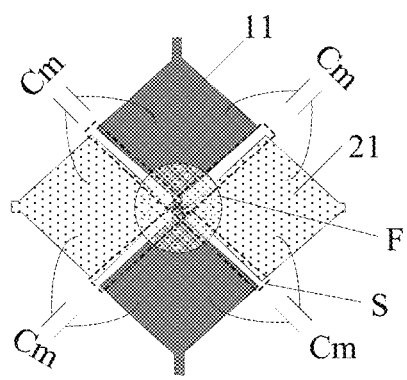
FIG. 5C is a schematic diagram illustrating the touch point at the intersecting position on the touch module showing in FIG. 5A.
Figure 5D:
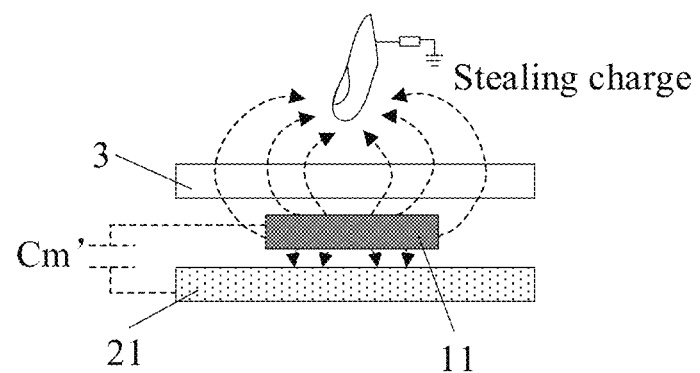
FIG. 5D is a schematic diagram illustrating the electronic field state of the touch module being touched on the point shown in FIG. 5C.
Figure 6A:
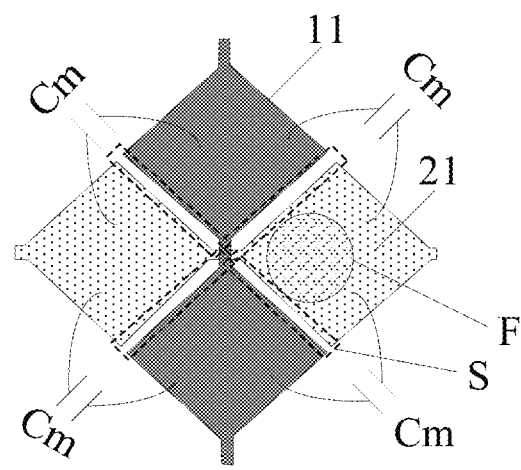
FIG. 6A is a schematic diagram illustrating the touch point at the non-intersecting position on the touch module showing in FIG. 5A.
Figure 6B:
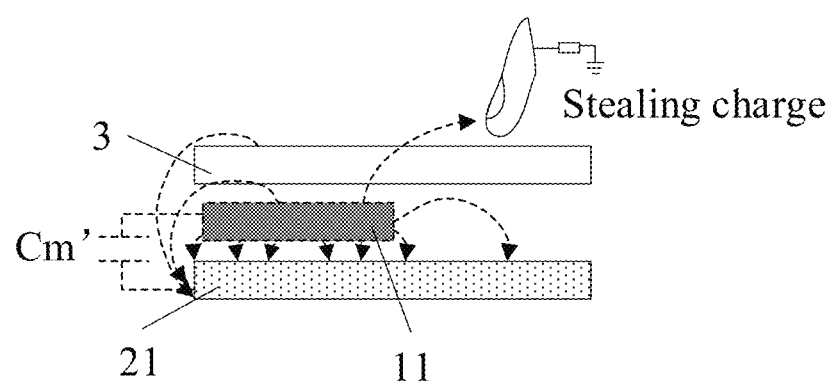
FIG. 6B is a schematic diagram illustrating the electronic field state of the touch module being touched on the point shown in FIG. 6A.
Figure 7A:
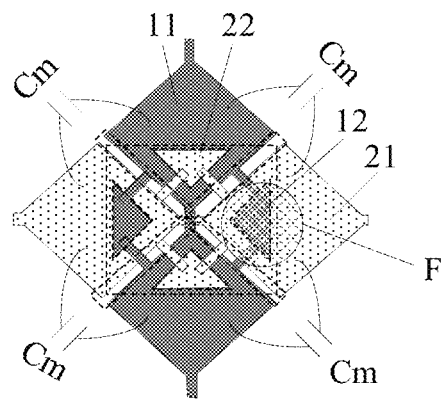
FIG. 7A is a schematic diagram illustrating the touch point being at a non-intersecting position in a touch module according to embodiments of the disclosure.
Figure 7B:
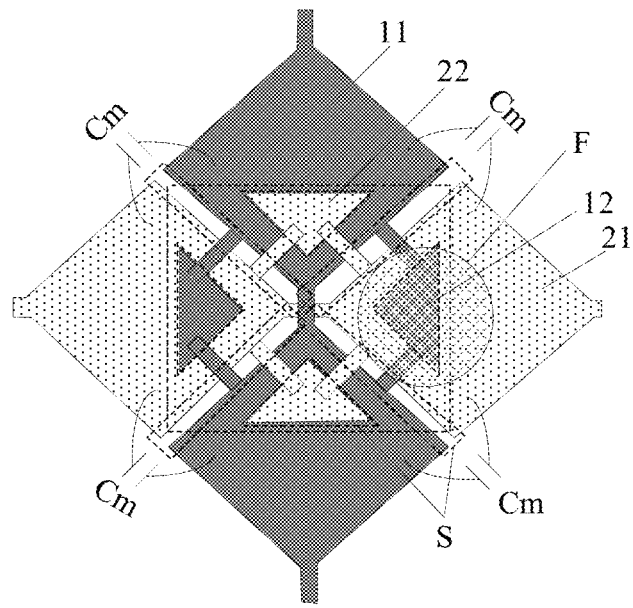
FIG. 7B is an enlarged view of the structure of FIG. 7A.
Figure 7C:
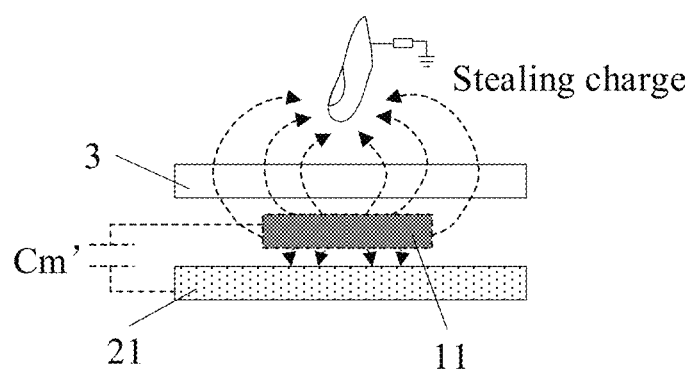
FIG. 7C is a schematic diagram illustrating the electronic field state of the touch module being touched on the point shown in FIGS. 7A and 7B.

FIGS. 5A and 5B are schematic diagrams showing the state of a traditional touch module before a touch when a touch position F is located at an intersecting position between the first touch electrodes and the second touch electrodes, and FIGS. 5C and 5D are schematic diagrams showing the state after the touch. FIGS. 6A and 6B are schematic diagrams of the traditional touch module being touched when the touch position F is located at a non-intersecting position. FIGS. 7A-7C are schematic diagrams of the touch module according to embodiments of the disclosure being touched when the touch position F is located at a non-intersecting position.

Touch sensitivity of the touch module is positively correlated with an amount of change in a mutual capacitance value $\Delta Cm=Cm-Cm'$ of the first touch electrodes 1 (the driving electrodes Tx)/the second touch electrodes 2 (the sensing electrodes Rx). That is, the larger $\Delta Cm$ is, the higher the touch sensitivity is. Adjacent coupling areas S of the first touch electrodes 1 and the second touch electrodes 2 form mutual capacitance (coupling capacitance) $Cm$. When a touch surface 3 of the touch module is touched, finger touch changes the original electric field state, resulting in a decrease of the coupling capacitance $Cm$ (an amount of decrease is $\Delta Cm$), and this phenomenon is stealing charge, as shown in FIG. 5D.

In the traditional design solution, the coupling areas S between the first touch electrodes 1 and the second touch electrodes 2 only exist at adjacent parts of edges of patterns of the first touch electrodes 1 and the second touch electrodes 2, and coupling areas do not exist in the interior of respective patterns. When the finger touches the interior of a pattern of the traditional touch electrode (Sensor), since a distance to the coupling areas S is far, as shown in FIG. 6B, the phenomenon of stealing charge is weak, the ΔCm then is small and sensitivity is weak.

In the embodiment of the disclosure, as shown in FIGS. 7A-7C, FIG. 7B is a schematic diagram of an enlarged structure shown in FIG. 7A. Through a special pattern and bridge design, a pattern of the second electrode blocks 12 is added inside the area of the third electrode blocks 21 of the touch module, and a pattern of the fourth electrode blocks 22 is added inside the area of the first electrode blocks 11, which makes full use of interior areas of the traditional touch patterns and increases the coupling areas S between the first touch electrodes 1 and the second touch electrodes 2. When the finger touches, more of the coupling areas S can be touched, the phenomenon of stealing charge is strong, and the amount of change in the mutual capacitance value ΔCm of the corresponding first touch electrodes 1 and second touch electrodes 2 will increase significantly, thereby increasing touch sensitivity.

In some embodiments, as shown in FIGS. 2, 3, 8 and 9, the first touch electrodes 1 and the second touch electrodes 2 may be located on the same film layer, or may be located on different film layers. When the first touch electrodes 1 and the second touch electrodes 2 are located on the same film layer, the third electrode blocks 21 have a first hollow region 15 in an area corresponding to the second electrode blocks 12, and an orthographic projection of the first hollow region 15 on the base substrate covers an orthographic projection of the second electrode blocks 12 on the base substrate. The first electrode blocks 11 have a second hollow region 25 in an area corresponding to the fourth electrode blocks 22, and an orthographic projection of the second hollow region 25 on the base substrate covers an orthographic projection of the fourth electrode blocks 22 on the base substrate.

In the embodiment of the disclosure, the first touch electrodes 1 and the second touch electrodes 2 are located on the same film layer. One patterning process may be used to form the third electrode blocks 21 and the fourth electrode blocks 22 of the second touch electrodes 2 while forming the first electrode blocks 11 and the second electrode blocks 12 of the first touch electrodes 1, which may simplify manufacturing process of the touch module.

Figure 8:
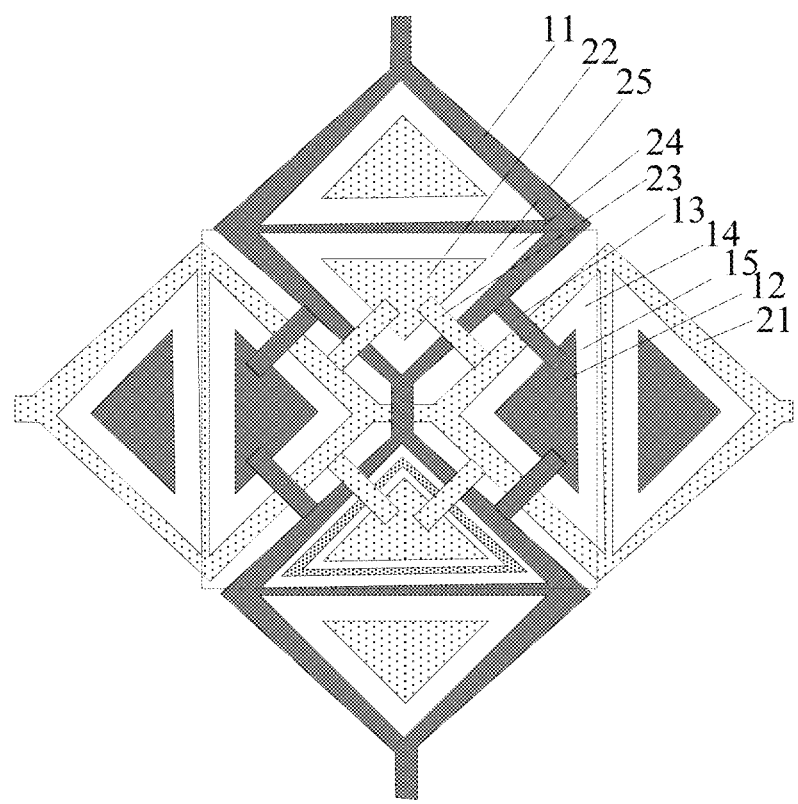
FIG. 8 is a schematic structural diagram of a touch module provided with a first hollow region and a second hollow region according to embodiments of the disclosure.

In some embodiments, as shown in FIG. 8, when the first touch electrodes 1 and the second touch electrodes 2 are located on the same film layer, the touch module may further include a first bridge 13 through which the second electrode blocks 12 and adjacent ones of the first electrode blocks 11 are connected in series. Similarly, the touch module may further include a second bridge 23 through which the fourth electrode blocks 22 and adjacent ones of the third electrode blocks 21 are connected in series.

In the embodiment of the disclosure, due to the first bridge 13 and the second bridge 23, the design of more parallel bridges exists in each of the first touch electrodes 1 and each of the second touch electrodes 2, which is beneficial to reduce channel impedance so as to improve touch drive performance.

In some embodiments, as shown in FIG. 4, an orthographic projection of the first bridge 13 on the base substrate 1 and an orthographic projection of the second bridge 23 on the base substrate 1 do not overlap with each other, which can avoid conduction of the first touch electrodes 1 and the second touch electrodes 2. Specifically, the orthographic projection of the first bridge 13 on the base substrate 1 and the orthographic projection of the second bridge 23 on the base substrate 1 may be parallel.

Figure 9:
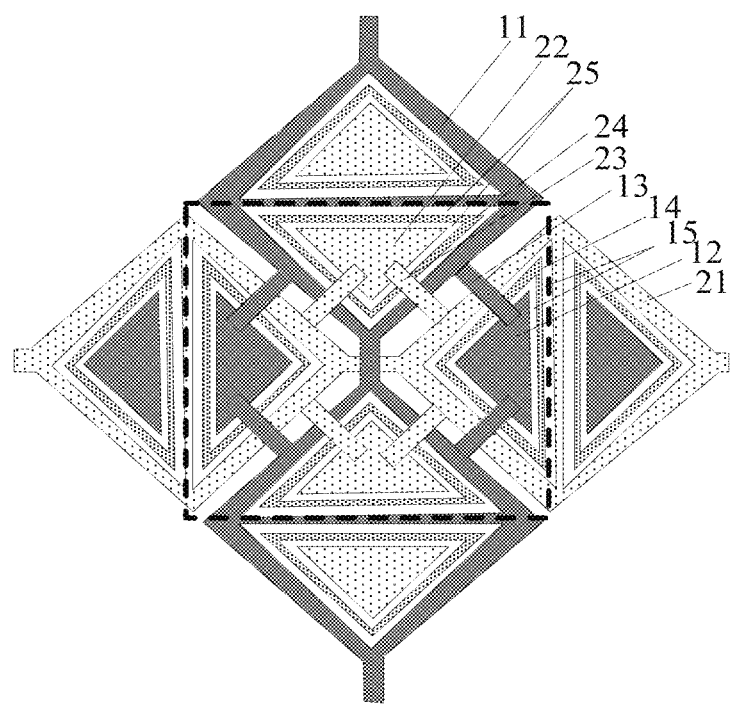
FIG. 9 is a schematic structural diagram of a touch module provided with a first floating electrode and a second floating electrode according to embodiments of the disclosure.

In some embodiments, referring to FIG. 9, the first hollow region 15 may have a first floating electrode 14 located at the periphery of the second electrode blocks 12. Specifically, an orthographic projection of the first floating electrode 14 on the base substrate 1 is a closed hollow pattern enclosing the second electrode blocks 12. The second hollow region 25 may have a second floating electrode 24 located on the periphery of the fourth electrode blocks 22, and an orthographic projection of the second floating electrode 24 on the base substrate 1 is a closed hollow pattern enclosing the fourth electrode blocks 22. In the embodiment of the disclosure, capacitance loading may be reduced by providing the first floating electrodes 14 and the second floating electrodes 24.

In some embodiments, the first floating electrode 14 in each first hollow region 15 may be a closed hollow pattern enclosing the second electrode blocks 12, and the second floating electrode 24 in the second hollow region 25 may be a closed hollow pattern enclosing the fourth electrode blocks 22. Specifically, gaps may be provided between the third electrode blocks 21 and the first floating electrode 14, and between the first floating electrode 14 and the second electrode blocks 12. Similarly, gaps may also be provided between the first electrode blocks 11 and the second floating electrode 24, and between the second floating electrode 24 and the fourth electrode blocks 22.

In some embodiments, the first touch electrodes 1 and the second touch electrodes 2 may also be located on different film layers. When the first touch electrodes 1 and the second touch electrodes 2 are located on different film layers, the arrangement mode of the first touch electrodes 1 and the second touch electrodes 2 may also be the same as when they are located on the same film layer. That is, in the third electrode blocks 22 of the second touch electrodes 2, a first hollow region may also be provided in an area corresponding to the second electrode blocks 12, and a second hollow region may be provided in an area of the first electrode blocks 11 corresponding to the fourth electrode blocks 22.

In some embodiments, as shown in FIGS. 8 and 9, each of the third electrode blocks 21 may have two second electrode blocks 12 belonging to different first touch electrodes 1, and the two second electrode blocks 12 in the same one of the third electrode blocks 21 are insulated from each other. Each of the first electrode blocks 11 may have two fourth electrode blocks 22 belonging to different second touch electrodes 2, and the two fourth electrode blocks 22 in the same one of the first electrode blocks 11 are insulated from each other.

In the embodiment of the disclosure, each of the third electrode blocks 21 is provided with two second electrode blocks 22, and each of the first electrode blocks 11 is provided with two fourth electrode blocks 22, which can effectively improve touch sensitivity of the touch module while reducing difficulty in manufacturing the touch module compared with providing more second electrode blocks 12 and more fourth electrode blocks 22. Of course, if manufacturing difficulty is not considered, more second electrode blocks may be provided in each of the third electrode blocks, or more fourth electrode blocks may be provided in each of the first electrode blocks.

In some embodiments, as shown in FIGS. 8 and 9, the shape of the third electrode blocks 21 may be a rhombus, the shape of the second electrode blocks 12 may be a triangle, and two sides of the second electrode blocks 12 and two sides of the third electrode blocks 21 are correspondingly set in parallel. The shape of the first electrode blocks 11 may be a rhombus, the shape of the fourth electrode blocks 22 may be a triangle, and two sides of the fourth electrode blocks 22 and two sides of the first electrode blocks 11 are correspondingly set in parallel.

In the embodiment of the disclosure, the shape of the third electrode blocks 21 is a rhombus, the shape of the second electrode blocks 12 is a triangle, and two sides of the second electrode blocks and two sides of the third electrode blocks are correspondingly set in parallel. The shape of the first electrode blocks 11 is a rhombus, the shape of the fourth electrode blocks 22 is a triangle, and two sides of the fourth electrode blocks 22 and two sides of the first electrode blocks 11 are correspondingly set in parallel, which extremely enables formation of a large coupling boundary between the first touch electrodes 1 and the second touch electrodes 2 and improves signal strength.

Figure 10:
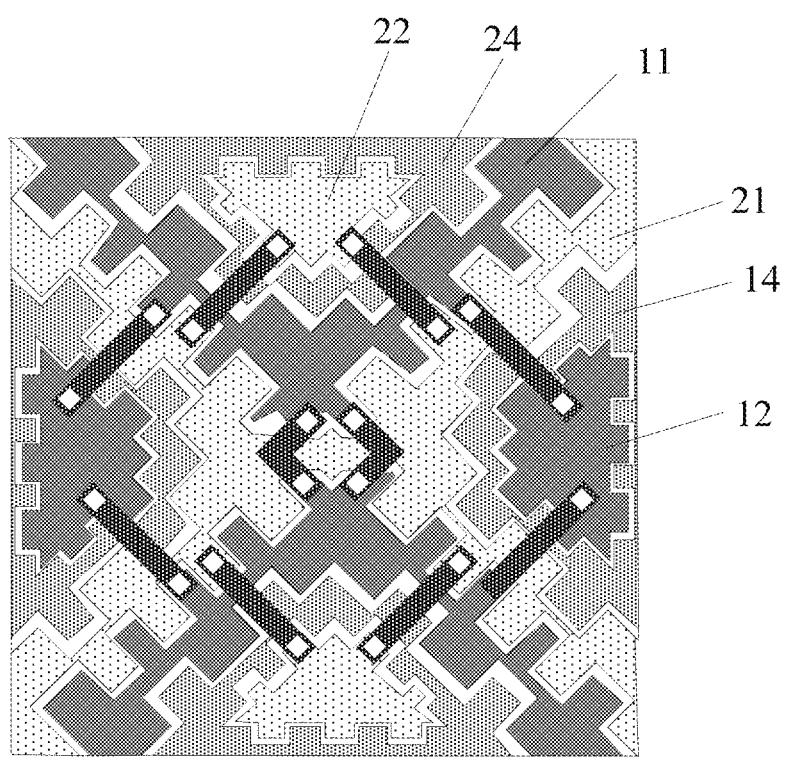
FIG. 10 is an enlarged view of the structure in the area indicated by a dashed box in FIG. 9.

In some embodiments, referring to FIG. 10, FIG. 10 is an enlarged schematic diagram of the dashed box area of FIG. 9. Outer boundaries of the second electrode blocks 12 and the third electrode blocks 21 opposite to each other may be in a concave-convex zigzag shape; and/or, outer boundaries of the fourth electrode blocks 22 and the first electrode blocks 11 opposite to each other may be in a concave-convex zigzag shape.

In the embodiment of the disclosure, the design of the outer boundaries in a concave-convex zigzag shape can increase the coupling boundaries between the first touch electrodes 1 and the second touch electrodes 2 and improve the signal strength. Of course, in some embodiments, the outer boundaries of the first floating electrode 14 and the second floating electrode 24 may also be set in a concave-convex zigzag shape.

Based on the same inventive concept, the embodiment of the disclosure further provides a touch display panel including the touch module according to the embodiment of the disclosure. Since the principles of solving the problem by the touch display panel are similar to those by the touch module, implementation of the touch module may be referred to for implementation of the touch display panel, and repetitions will be omitted herein.

Figure 11A:
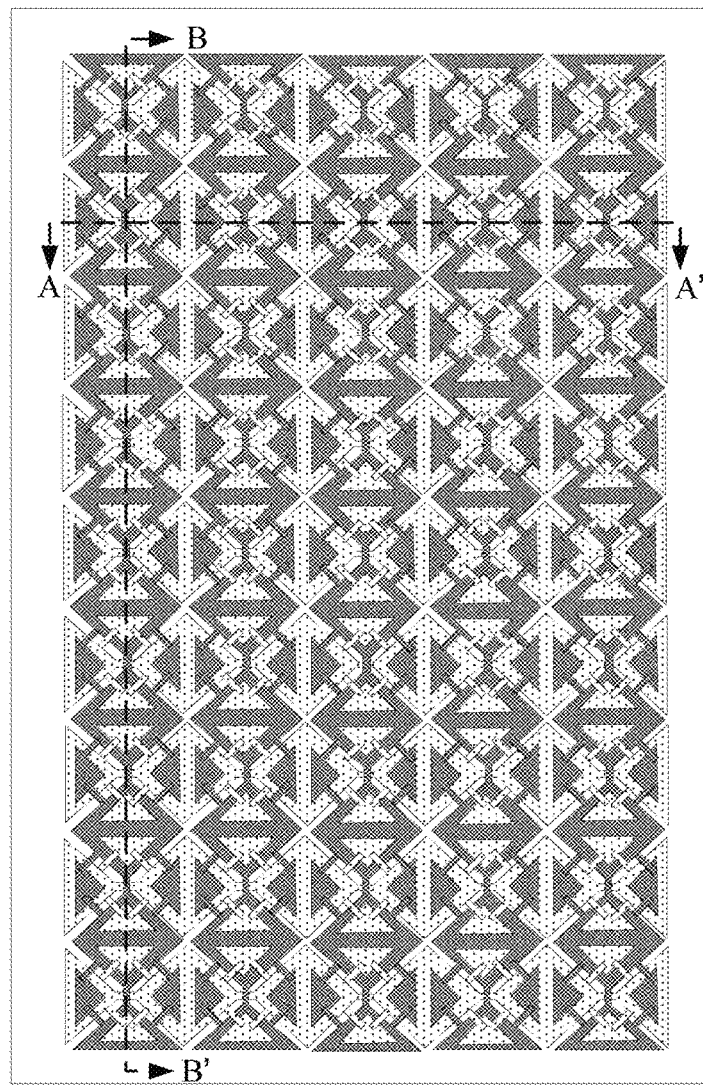
FIG. 11A is a plan view of a touch display panel according to embodiments of the disclosure.
Figure 11B:
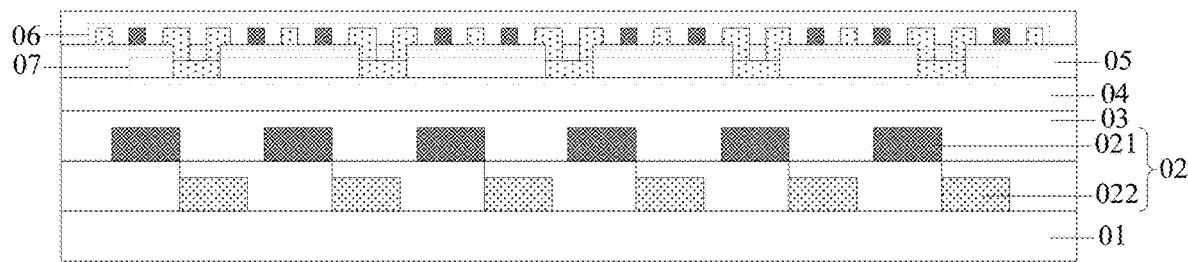
FIG. 11B is a cross-sectional view along the line A-A' in FIG. 11A.
Figure 11C:
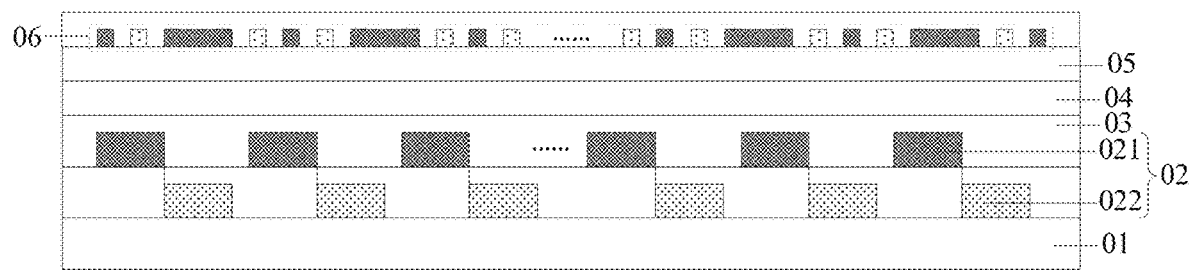
FIG. 11C is a cross-sectional view along the line B-B' in FIG. 11A.

FIG. 11A is a plan view of a touch display panel according to some embodiments of the disclosure. FIG. 11B is a cross-sectional view along the line A-A' in FIG. 11A. FIG. 11C is a cross-sectional view along the line B-B' in FIG. 11A. In some embodiments, the touch display panel may include a light emitting device 02 on the base substrate 01 and a packaging structure 03 for packaging the light emitting device 02, and the touch electrodes are on one side of the packaging structure 03 facing away from the light emitting device 02. That is, the touch electrodes are located above the packaging structure 03.

Specifically, the light emitting device 02 includes a display element 021 and a thin film transistor 022. For example, in an organic light emitting diode display panel, the display element 021 includes a plurality of light emitting diodes. For another example, in a liquid crystal display panel, the display element 021 includes a liquid crystal layer in a plurality of sub-pixels. Referring to FIGS. 11B to 11C, in some embodiments, the touch display panel includes a base substrate 01, a plurality of thin film transistors 022 on the base substrate 01, and a plurality of light emitting elements 021 on the base substrate 01 and connected respectively to the plurality of thin film transistors 022.

In some embodiments, the packaging structure 03 may include a first inorganic layer, an organic layer and a second inorganic layer that are stacked in sequence; and the touch display panel may further include a buffer layer 04 between the second inorganic layer and the touch electrodes.

In some embodiments, the touch display panel further includes the packaging structure 03 for packaging the plurality of display elements 021, the buffer layer 04 located on one side of the packaging layer 03 facing away from the base substrate 01, and an insulation layer 05 located on one side of the buffer layer 04 facing away from the packaging layer 03. In some embodiments, when the first touch electrodes and the second touch electrodes are on the same film layer, specifically all of the electrode blocks may be located on an electrode layer 06, bridges such as the first bridge and the second bridge may be located on a bridge layer 07, and the insulation layer 05 may be located between the bridge layer 07 and the electrode layer 06.

Based on the same inventive concept, the embodiment of the disclosure further provides a display device including the touch display panel according to the embodiments of the disclosure. The display device may be any product or component with a display function, such as a mobile phone, a tablet computer, a television, a monitor, a notebook computer, a digital photo frame, and a navigator. Embodiments of the touch display panel may be referred to for implementation of the display device, and repetitions will be omitted herein.

The beneficial effects of the embodiments of the disclosure are as follows: in the same one of the first touch electrodes in the touch module, the touch display panel and the display device according to the embodiments of the disclosure, the plurality of first electrode blocks are arranged in sequence along the first direction and are connected in series, the second electrode blocks are located in the area where the third electrode blocks adjacent to the first electrode blocks are located, and the second electrode blocks and adjacent ones of the first electrode blocks are connected in series; and in the same one of the second touch electrodes, the plurality of third electrode blocks are arranged in sequence along the second direction and are connected in series, the fourth electrode blocks are located in the area where the first electrode blocks adjacent to the third electrode blocks are located, and the fourth electrode blocks and adjacent ones of the third electrode blocks are connected in series. That is, the third electrode blocks of the second touch electrodes are provided with the second electrode blocks of the first touch electrodes, and the first electrode blocks of the first touch electrodes are provided with the fourth electrode blocks of the second touch electrodes, which makes full use of interior areas of the third electrode blocks and the first electrode blocks, and increases the coupling area between the first touch electrodes and the second touch electrodes. When the finger touches, the amount of change in the mutual capacitance value of the corresponding first touch electrodes and second touch electrodes will be significantly increased, thereby increasing touch sensitivity and solving the problem of low touch sensitivity in related technologies.

Obviously, those skilled in the art can make various changes and modifications to the disclosure without departing from the spirits and scopes of the disclosure. In this way, if these modifications and variations of the disclosure fall within the scope of the claims of the disclosure and their equivalent technologies, the disclosure is also intended to include these modifications and variations.

What is claimed is:

1. A touch module, comprising:
a base substrate; and
a plurality of touch electrodes on the base substrate;
wherein
the plurality of touch electrodes comprise a plurality of
first touch electrodes extending along a first direction and a plurality of second touch electrodes extending along a second direction;

each of the plurality of first touch electrodes comprises a plurality of first electrode blocks and a plurality of second electrode blocks, and each of the plurality of second touch electrodes comprises a plurality of third electrode blocks and a plurality of fourth electrode blocks;

in a same one of the plurality of first touch electrodes,
the plurality of first electrode blocks are arranged in sequence along the first direction;
each of the plurality of second electrode blocks is located in an area where a third electrode block adjacent to the plurality of first electrode blocks are located;
the plurality of second electrode blocks and the plurality of third electrode blocks are insulated from each other; and
the plurality of third electrode blocks each has a first hollow region in an area corresponding to a second electrode block, and an orthographic projection of the first hollow region on the base substrate is larger than an orthographic projection of the second electrode block on the base substrate;

and in a same one of the second touch electrodes,
the plurality of third electrode blocks are arranged in sequence along the second direction;
each of the plurality of fourth electrode blocks is located in an area where a first electrode block adjacent to the plurality of third electrode blocks are located;
the plurality of fourth electrode blocks and the plurality of first electrode blocks are insulated from each other; and
the plurality of first electrode blocks each has a second hollow region in an area corresponding to a fourth electrode block, and an orthographic projection of the second hollow region on the base substrate is larger than an orthographic projection of the fourth electrode block on the base substrate.

2. The touch module according to claim 1, wherein
in the same one of the plurality of first touch electrodes, each of the plurality of second electrode blocks is connected in series with an adjacent first electrode block;
in the same one of the second touch electrodes, each of the plurality of fourth electrode blocks is connected in series with an adjacent third electrode block.

3. The touch module according to claim 2, wherein,
in the same one of the first touch electrodes, the plurality of first electrode blocks arranged in sequence along the first direction are connected in series; and
in the same one of the second touch electrodes, the plurality of third electrode blocks arranged in sequence along the second direction are connected in series.

4. The touch module according to claim 2, wherein the plurality of first touch electrodes and the plurality of second touch electrodes are in a same film layer.

5. The touch module according to claim 2, wherein,
the touch module further comprises a first bridge through which each of the plurality of second electrode blocks and adjacent ones of the plurality of first electrode blocks are connected in series; and
the touch module further comprises a second bridge through which each of the plurality of fourth electrode blocks and adjacent ones of the plurality of third electrode blocks are connected in series.

6. The touch module according to claim 5, wherein an orthographic projection of the first bridge on the base substrate and an orthographic projection of the second bridge on the base substrate do not overlap with each other.

7. The touch module according to claim 5, wherein all electrode blocks are in an electrode layer, the first bridge and the second bridge are in a bridge layer, and the bridge layer and the electrode layer have an insulation layer therebetween.

8. The touch module according to claim 7, wherein the bridge layer is between the electrode layer and the base substrate.

9. The touch module according to claim 4, wherein the first hollow region is provided therein a first floating electrode at a periphery of the second electrode block, and an orthographic projection of the first floating electrode on the base substrate is a closed hollow pattern enclosing the second electrode block.

10. The touch module according to claim 4, wherein the second hollow region is provided therein a second floating electrode at a periphery of the fourth electrode block, and an orthographic projection of the second floating electrode on the base substrate is a closed hollow pattern enclosing the fourth electrode block.

11. The touch module according to claim 2, wherein the plurality of first touch electrodes and the plurality of second touch electrodes are in different film layers.

12. The touch module according to claim 2, wherein each of the plurality of third electrode blocks has two second electrode blocks belonging to different first touch electrodes, and the two second electrode blocks in a same third electrode block are insulated from each other.

13. The touch module according to claim 2, wherein each of the plurality of first electrode blocks has two fourth electrode blocks belonging to different second touch electrodes, and the two fourth electrode blocks in a same first electrode block are insulated from each other.

14. The touch module according to claim 2, wherein opposite outer boundaries of each of the plurality of second electrode blocks and the plurality of third electrode blocks are in a concave-convex zigzag shape; and/or, opposite outer boundaries of each of the plurality of fourth electrode blocks and the plurality of first electrode blocks are in a concave-convex zigzag shape.

15. The touch module according to claim 2, wherein a shape of each of the plurality of third electrode blocks is a rhombus, a shape of each of the plurality of second electrode blocks is a triangle, and two sides of each of the plurality of second electrode blocks and two sides of a corresponding third electrode block are set in parallel.

16. The touch module according to claim 2, wherein a shape of each of the plurality of first electrode blocks is a rhombus, a shape of each of the plurality of fourth electrode blocks is a triangle, and two sides of each of the plurality of fourth electrode blocks and two sides of a first corresponding electrode block are set in parallel.

17. A touch display panel comprising a touch module, wherein the touch module comprises:
a base substrate; and
a plurality of touch electrodes on the base substrate; wherein
the plurality of touch electrodes comprise a plurality of first touch electrodes extending along a first direction and a plurality of second touch electrodes extending along a second direction;

each of the plurality of first touch electrodes comprises a plurality of first electrode blocks and a plurality of second electrode blocks, and each of the plurality of second touch electrodes comprises a plurality of third electrode blocks and a plurality of fourth electrode blocks;

in a same one of the plurality of first touch electrodes,
the plurality of first electrode blocks are arranged in sequence along the first direction;
each of the plurality of second electrode blocks is located in an area where a third electrode block adjacent to the plurality of first electrode blocks are located;
the plurality of second electrode blocks and the plurality of third electrode blocks are insulated from each other; and
the plurality of third electrode blocks each has a first hollow region in an area corresponding to a second electrode block, and an orthographic projection of the first hollow region on the base substrate is larger than an orthographic projection of the second electrode block on the base substrate;

and in a same one of the second touch electrodes,
the plurality of third electrode blocks are arranged in sequence along the second direction;
each of the plurality of fourth electrode blocks is located in an area where a first electrode block adjacent to the plurality of third electrode blocks are located;
the plurality of fourth electrode blocks and the plurality of first electrode blocks are insulated from each other; and
the plurality of first electrode blocks each has a second hollow region in an area corresponding to a fourth electrode block, and an orthographic projection of the second hollow region on the base substrate is larger than an orthographic projection of the fourth electrode block on the base substrate.

18. The touch display panel according to claim 17, further comprising:
a light emitting device on the base substrate; and
a packaging structure for packaging the light emitting device;
wherein the plurality of touch electrodes are on a side of the packaging structure facing away from the light emitting device.

19. The touch display panel according to claim 18, wherein the packaging structure comprises a first inorganic layer, an organic layer and a second inorganic layer that are stacked in sequence, wherein, the touch display panel further comprises a buffer layer between the second inorganic layer and the plurality of touch electrodes.

20. A display device comprising a touch display panel, wherein the touch display panel comprises a touch module comprising:
a base substrate; and
a plurality of touch electrodes on the base substrate; wherein
the plurality of touch electrodes comprise a plurality of first touch electrodes extending along a first direction and a plurality of second touch electrodes extending along a second direction;
each of the plurality of first touch electrodes comprises a plurality of first electrode blocks and a plurality of second electrode blocks, and each of the plurality of second touch electrodes comprises a plurality of third electrode blocks and a plurality of fourth electrode blocks;

in a same one of the plurality of first touch electrodes,
the plurality of first electrode blocks are arranged in sequence along the first direction;
each of the plurality of second electrode blocks is located in an area where a third electrode block adjacent to the plurality of first electrode blocks are located;
the plurality of second electrode blocks and the plurality of third electrode blocks are insulated from each other; and
the plurality of third electrode blocks each has a first hollow region in an area corresponding to a second electrode block, and an orthographic projection of the first hollow region on the base substrate is larger than an orthographic projection of the second electrode block on the base substrate;

and in a same one of the second touch electrodes,
the plurality of third electrode blocks are arranged in sequence along the second direction;
each of the plurality of fourth electrode blocks is located in an area where a first electrode block adjacent to the plurality of third electrode blocks are located;
the plurality of fourth electrode blocks and the plurality of first electrode blocks are insulated from each other; and
the plurality of first electrode blocks each has a second hollow region in an area corresponding to a fourth electrode block, and an orthographic projection of the second hollow region on the base substrate is larger than an orthographic projection of the fourth electrode block on the base substrate.

* * * * *